United States Patent Office 2,951,057
Patented Aug. 30, 1960

2,951,057

CYCLO-DIENE SILANE DERIVATIVES

Herbert K. Wiese, Cranford, and Joseph F. Nelson and Charles E. Morrell, Westfield, N.J., assignors to Esso Research and Engineering Company, a corporation of Delaware No Drawing. Filed July 13, 1953, Ser. No. 367,758

13 Claims. (Cl. 260—46.5)

This invention relates to the preparation of novel silane derivatives of diolefinic compounds and processes for the preparation thereof.

The invention is particularly concerned with the formation of trichlorosilane derivatives of a cyclopentadiene.

In specific embodiments the sodium salt of cyclopentadiene or its homologs, such as methyl cyclopentadiene, dimethylcyclopentadiene, and other aliphatic diolefinic compounds having a minimum of five carbon atoms, such as 1,4 pentadiene are reacted with silicon tetrachloride to produce new and useful compositions typified by the following two general formulas:

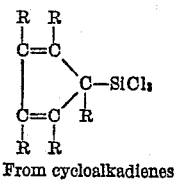

From cycloalkadienes or

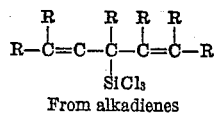

From alkadienes

R represents hydrogen or substituents, usually methyl or other alkyl groups

The trichlorosilane-diene products are prepared advantageously from a diolefinic hydrocarbon of at least five carbon atoms in which a pair of double bonded carbon atoms (—C=C—) are interlinked through the carbon atom of a methylene group (—CH$_2$—) wherein hydrogen is replaced by a metal to give a metallo-organic salt of the diolefin.

The sodium salts of cyclopentadiene, alkylated cyclopentadiene or other suitable diolefins are prepared by reacting these diolefins with finely divided dispersed metallic sodium activated by a suitable agent, such as anhydrous alcohol. The metallic sodium is preferably dispersed in a finely divided state, i.e. of average particle size, less than 50 microns in diameter in an inert hydrocarbon liquid medium such as benzene, toluene, other aromatic or aliphatic hydrocarbons, and in this form with the presence of a small amount of anhydrous alcohol reacts readily with the described types of diolefinic hydrocarbons to form the sodium salt. The sodium-diene salt such as the sodium salt of cyclopentadiene, dispersed in a neutral or inert liquid medium, such as benzene, or other aromatic or aliphatic hydrocarbon, is reacted with admixed silicon tetrachloride at temperatures ranging from —25° C. to 100° C. The silicon tetrachloride can be admixed as such or be used diluted with some solvent, such as benzene, other aromatic, aliphatic, or cycloaliphatic hydrocarbon.

As an example, 1 mole of cyclopentadienyl sodium dispersed in benzene was added to 2.7 moles of silicon tetrachloride diluted with benzene. The temperature of the reaction flask was maintained between 25° C. and 30° C. by using a cooling bath around the flask and regulating the addition of cyclopentadienyl sodium. The reaction mixture was continuously stirred. The entire system was blanketed with dry nitrogen to keep out moisture and oxygen.

The reaction product formed in the described reaction was isolated as follows:

The liquid phase was decanted from solid sodium chloride which precipitated in the reaction mixture, and the liquid phase was distilled. After the benzene and unreacted silicon tetrachloride were distilled overhead, the cyclopentadiene trichlorosilane product boiling between 45° and 48° C. under 7 mm. Hg abs. was collected as a water-white liquid product. It had a density of about 1.3 at room temperature (26.5° C.). The yield of this trichlorosilane product was 40 wt. percent based on the sodium used for preparing the cyclopentadienyl sodium. In addition to the cyclopentadiene trichlorosilane distillate product, some higher boiling material containing chlorosilane groups was obtained as a bottoms residue in the distillation pot. This higher boiling material consisted of a mixture of chlorosilanes having the following structures:

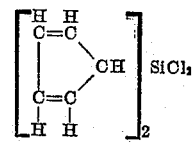

and

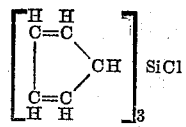

In the described experiment and in other experiments it was found that the reaction can be controlled to obtain selective yields of the cyclopentadienyl trichlorosilane or the higher boiling chlorosilanes, containing more than one cyclopentadiene ring per molecule, as shown above, depending on the ratio of the diene salt to the silane reactant. Increasing the silane reactant silicon tetrachloride, with respect to the sodium salt of the cyclopentadiene, increases the yields of the cyclopentadiene trichlorosilane, which is the preferred product for use in obtaining many of the new derivatives.

A number of physical and chemical analytical tests were made on the products. Ultraviolet analysis shows that in the trichlorosilane product there definitely remains the cyclopentadiene ring structure, e.g., in the amount of 39, plus or minus 5%, which compares closely to the theoretical of 33%. The monomeric product, cyclopentadiene trichlorosilane, is a relatively low melting point liquid having a density of 1.36 g./cc. at 20° C. It boils in the range of 52–55° C. at 10 mm. Hg absolute. A heart cut of this material boils at 53–54° C. under the same pressure. It is a water-white liquid soluble in aromatic hydrocarbons, in aliphatic hydrocarbons, in ethers, in carbon tetrachloride and in chloroform. It is very reactive with water, alcohols, and other organic compounds having an active hydrogen.

A number of tests have been shown that the silane derivatives of the conjugated diolefins exemplified by cyclopentadienyl trichlorosilane undergo certain useful and unique reactions which cannot be applied to silane derivatives of other kinds of unsaturated hydrocarbons, such as vinyl trichlorosilane.

The cyclopentadiene silanes react with maleic anhydride in the manner of a conjugated diene. One mole of cyclopentadiene trichlorosilane was reacted quantitatively for 2 hours at 120° C. with 1 mole of maleic anhydride. The reaction product or adduct was a semisolid waxy material soluble in ethyl ether. This new material was indicated to contain carboxyl groups which could be esterified or neutralized. The reaction product can be hydrolyzed with water, is soluble in ethyl ether, and in dilute caustic forms a sodium salt. These properties of the adduct formed with the maleic anhydride were in contrast to the properties of the hydrolyzed cyclopentadiene trichlorosilane, said hydrolyzed derivative being insoluble in water, ethyl ether, or dilute aqueous caustic. Also, tests showed vinyl trichlorosilane was not reactive with maleic anhydride under conditions which were used.

The cyclopentadienyl trichlorosilane monomer can be thoroughly polymerized at temperatures between 75° and 200° C. At 125° C. for 2 hours residence time about 25% polymer (mostly dimer) is produced. This was in contrast to tests showing that vinyl trichlorosilane could not be thermally polymerized under the same conditions.

Another example of the high reactivity belonging to the diene-silanes is brought out in a test on the use of these silanes as binding agent for cellulosic material, e.g. sawdust. When equal amounts of sawdust and cyclopentadienyl trichlorosilane were mechanically mixed at room temperature, slightly pressed together, then heated for 15 minutes at 150° C. the sawdust was converted to a very porous coherent mass which could be shaped into blocks or other convenient forms useful as insulating material on account of its porous nature. No such binding of sawdust could be effected with vinyl trichlorosilane.

Cyclopentadienyl trichlorsilane and the related silanes of diolefins can be used as film-forming materials on objects such as plate glass, bottles, ceramics, masonry, etc. without any elaborate pretreatment of the solid surface prior to applying the silanes as a coating. For example, cyclopentadienyl silane was spread on a glass surface only visibly dry. It was spread on as such and in solution and under ordinary atmospheric conditions the cyclopentadienyl trichlorsilane formed a very hard adherent film.

A hard glossy clear film was obtained when cyclopentadienyl trichlorosilane was placed between two pieces of glass pressed together for about 4 hours. Vinyl trichlorosilane does not form an adherent film in the manner described. A polymer of cyclopentadienyl siloxane was produced by converting cyclopentadienyl trichlorosilane to an alkoxy derivative by reaction with isopropyl alcohol, then hydrolyzing the cyclopentadienyl tri-isopropoxysilane. This siloxane formed a hard film on glass, also. A force of about $13 \times 10^5$ dynes (measured on the Interchemical Adherometer) was required to remove a strip of film 4 mm. wide and about 3 mils thick. This indicates strong adhesion to the glass. This film forming property of the cyclopentadienyl trichlorosilane and its siloxane polymer derivative on ordinary glass indicates many possible uses. For example, these substances may be used in paints, stenciling fluids, or other coating compositions for decorative and utilitarian purposes.

Many other derivatives can be obtained in addition to the alkoxy ether, and salt type derivatives described. The chlorine in the silane radical may be replaced by another halogen, particularly bromine by reacting silicon tetrabromide with the sodium salt of diolefinic hydrocarbons. The halogen constituents are replaceable by organic groups. For example by reacting them with mercaptans, alcohols, sodium salts of organic acids and phenolic type compounds. Although an economical and advantageous method has been described for producing the silanes of the diolefins starting with the sodium or alkali metal salt of the diolefinic hydrocarbon, it is possible to use other methods of reaction for substituting sodium or another reactive metal, such as potassium or lithium for hydrogen which is linked to the methylene carbon atom between two double bonds. The alkali metal may be made to react as an amide with the diolefins. Other types of agents may be used, such as a Grignard agent.

Having described the invention, it is claimed as follows:

1. A compound having the following structural formula:

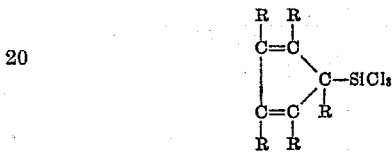

where R is a radical selected from the group consisting of hydrogen and lower alkyl.

2. Cyclopentadienyl silane in which silicon is attached to a methylene carbon between double bond groups and is attached to 3 chlorine atoms.

3. Cyclopentadienyl silane in which a silicon trihalide group is attached, through the silicon atom, to the methylene carbon atom of the cyclopentadiene ring.

4. As a new composition of matter: (cyclopentadienyl) $SiCl_3$.

5. The method of preparing cyclopentadienyl trihalosilane which comprises reacting in a temperature range of −25° C. to 30° C. a reaction mixture consisting essentially of sodium cyclopentadiene, a silicon tetrahalide and an inert liquid medium.

6. A process according to claim 5 wherein the silicon tetrahalide is silicon tetrachloride.

7. The method of preparing cyclopentadienyl trichlorosilane which comprises reacting sodium salt of cyclopentadiene with silicon tetrachloride.

8. The process of preparing a trichlorosilane of a cyclopentadiene which comprises attaching a silicon trichloride group to the methylene carbon atom of the cyclopentadiene ring by reacting silicon tetrachloride with an alkali metal salt of a cyclopentadiene selected from the group consisting of cyclopentadiene and methyl substituted cyclopentadienes.

9. A process according to claim 8 wherein the cyclopentadiene is cyclopentadiene.

10. The method of preparing a silane trihalide of a cyclopentadiene which comprises reacting an alkali metal of a cyclopentadiene selected from the group consisting of cyclopentadiene and methyl substituted cyclopentadienes to form an alkali metal salt thereof in which the alkali metal is substituted for hydrogen of the methylene group of the cyclopentadiene ring, then reacting said alkali metal salt with a silicon tetrahalide to substitute a silicon trihalide radical for the attached alkali metal.

11. A process according to claim 10 wherein the cyclopentadiene is cyclopentadiene.

12. A hard polymer film of cyclopentadienyl trichlorosilane supported on a solid surface, the silicon atom being attached to the methylene carbon atom of the cyclopentadiene ring, said polymer film being formed by spreading a solution of cyclopentadienyl trichlorosilane on the solid surface under ordinary atmospheric conditions.

13. A hard polymer film of a hydrolyzed cyclopentadienyl triisopropoxysilane supported on a solid surface, the silicon atom being attached to the methylene carbon atom of the cyclopentadiene ring, said polymer film being formed by reacting a cyclopentadienyl trichlorosilane with isopropyl alcohol, said cyclopentadienyl radical of the trichlorosilane being selected from the group consisting of cyclopentadienyl and methyl substituted cyclopentadienyl radicals, hydrolyzing the resulting cyclopentadienyl triisopropoxysilane, and spreading the hydrolyzed cyclopentadienyl tri-isopropoxysilane on the solid surface under ordinary atmospheric conditions.

References Cited in the file of this patent

UNITED STATES PATENTS

| | | |
|---|---|---|
| 2,238,669 | Wiley | Apr. 15, 1941 |
| 2,386,452 | Fleming | Oct. 9, 1945 |
| 2,563,074 | Schmerling | Aug. 7, 1951 |
| 2,667,501 | Martin | Jan. 26, 1954 |

FOREIGN PATENTS

| | | |
|---|---|---|
| 596,668 | Great Britain | Jan. 8, 1948 |

OTHER REFERENCES

Rochow: "An Introduction to the Chemistry of the Silicones," 2nd edition, Feb. 5, 1952, pp. 51–54, Wiley & Sons, publisher, New York.